US010145445B1

United States Patent
Anderies et al.

(10) Patent No.: US 10,145,445 B1
(45) Date of Patent: Dec. 4, 2018

(54) WHEEL BALANCE DEVICE FOR A MOTORCYCLE

(71) Applicants: Christopher Gerard Anderies, Montrose, CO (US); Jeanette Anderies, Montrose, CO (US)

(72) Inventors: Christopher Gerard Anderies, Montrose, CO (US); Jeanette Anderies, Montrose, CO (US)

(73) Assignee: Christopher Gerard Anderies, Montrose, CO (US)

( * ) Notice: Subject to any disclaimer, the term of this patent is extended or adjusted under 35 U.S.C. 154(b) by 69 days.

(21) Appl. No.: 15/424,288

(22) Filed: Feb. 3, 2017

(51) Int. Cl.
*F16F 15/34* (2006.01)
*F16F 15/32* (2006.01)

(52) U.S. Cl.
CPC .......... *F16F 15/345* (2013.01); *F16F 15/324* (2013.01); *B60B 2900/113* (2013.01); *B60Y 2200/12* (2013.01)

(58) Field of Classification Search
CPC ......... F16F 15/34; F16F 15/324; F16F 15/345
USPC ....................................... 301/5.21
See application file for complete search history.

(56) References Cited

U.S. PATENT DOCUMENTS

| 1,667,344 | A | * | 4/1928 | Couture | F16F 15/324 |
| | | | | | 301/5.21 |
| 1,833,879 | A | * | 11/1931 | Ash | F16F 15/324 |
| | | | | | 301/5.21 |
| 1,889,577 | A | * | 11/1932 | Tibbetts | F16F 15/324 |
| | | | | | 301/5.21 |
| 2,304,816 | A | * | 12/1942 | Griffith | F16F 15/324 |
| | | | | | 301/5.21 |
| 9,447,842 | B2 | * | 9/2016 | Wesling | F16F 15/345 |

FOREIGN PATENT DOCUMENTS

| DE | 3529508 | A1 | * | 2/1987 | ............ F16F 15/324 |
| EP | 3199831 | A1 | * | 8/2017 | |
| FR | 627995 | A | * | 10/1927 | ............ F16F 15/324 |
| FR | 856481 | A | * | 6/1940 | ............ F16F 15/324 |
| JP | 60061302 | A | * | 4/1985 | ............ F16F 15/324 |

* cited by examiner

*Primary Examiner* — Kip T Kotter

(57) ABSTRACT

A wheel balance device for a motorcycle attachable to a motorcycle wheel rim. The wheel balance device includes a pedestal vertically attachable to a crown of an inner rim of the motorcycle wheel rim in a position between a pair of spokes on opposite side of the crown and having a first end attachable to the crown, a second end, an outer wall therebetween, a transverse orifice therethrough, and a longitudinal channel continuously disposed therethrough. A weight body, having an arc substantially conforming to a shape of the inner rim, is insertable through the transverse orifice and has a hole transversely disposed therethrough, which is alignable with the channel when the weight body is inserted into the transverse orifice. A fastener, which engages both the channel pedestal and the hole of the weight body, secures the weight body to the pedestal.

15 Claims, 3 Drawing Sheets

WHEEL BALANCE DEVICE FOR A MOTORCYCLE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION TO ALL WHOM IT MAY CONCERN

Be it known that we, Christopher Gerard Anderies and Jeanette Anderies, citizens of the United States, have invented new and useful improvements in a wheel balance device for a motorcycle as described in this specification.

BACKGROUND OF THE INVENTION

Various types of vehicle motorcycle apparatuses are known in the prior art. However, what has been needed is a wheel balance device including a pedestal vertically attachable to a crown of an inner rim of a motorcycle wheel rim. The pedestal has a first end and a second end opposite the first end. The pedestal is preferably cylindrical. The first end conforms to a shape of the crown. A longitudinal channel is disposed through the pedestal and an orifice is transversely disposed through the pedestal. What has been further needed is a weight body insertable through the orifice, with the weight body arched to substantially conform to a shape of the inner rim. Lastly, a threaded fastener securingly engages both the channel and the hole through the weight body, with the threaded fastener securing the weight body to the pedestal. The durable wheel balance device thus enables a user to balance a motorcycle wheel and to securely fasten the device to the motorcycle so that the tire and the tube is less difficult to replace.

FIELD OF THE INVENTION

The present invention relates to motorcycle apparatuses, and more particularly, to a wheel balance device for a motorcycle.

SUMMARY OF THE INVENTION

The general purpose of the present wheel balance device for a motorcycle, described subsequently in greater detail, is to provide a wheel balance device for a motorcycle which has many novel features that result in a wheel balance device for a motorcycle which is not anticipated, rendered obvious, suggested, or even implied by prior art, either alone or in combination thereof.

To accomplish this, the present wheel balance device for a motorcycle includes a pedestal vertically attachable to a crown of an inner rim of a motorcycle wheel rim. The pedestal has a first end, a second end opposite the first end, and an outer wall disposed between the first end and the second end. As illustrated, the pedestal is preferably cylindrical; however, the pedestal is not limited to a cylindrical shape. In addition, the first end is preferably concave as illustrated, but is not constrained to a concave shape. The first end conforms to a shape of the crown. A longitudinal channel is centrally disposed through an entire length of the pedestal. An orifice is transversely disposed through the pedestal. The orifice can be centered or alternately disposed more proximal either the first end or the second end. The longitudinal channel intersects with the orifice within the pedestal.

A weight body is insertable through the orifice. The weight body is arched to substantially conform to a shape of the inner rim. The weight body has a front end and a rear end. A hole is transversely disposed through the weight body. The hole is alignable with the channel when the weight body is inserted through the orifice.

A threaded fastener securingly engages both the channel and the hole through the weight body when the weight body is inserted through the orifice and the hole of the weight body is aligned with the channel. The threaded fastener secures the weight body to the pedestal in a transverse position with the front end of the weight body on one side of the pedestal and the rear end of the weight body on an opposite side of the pedestal from the front end.

The threaded fastener has an outer end and a threaded shaft extending from an oval head. The threaded fastener also includes either a threaded lock nut or a threaded bolt, either which works in conjunction with the threaded shaft to secure the weight body to the pedestal. When the threaded lock nut is provided, the threaded shaft engages both the entire channel and the hole through the weight body and the threaded lock nut securingly engages the outer end of the threaded shaft in a position directly adjacent the second end. Alternatively, when the threaded bolt is provided, each of the first end and the hole is threaded, the threaded shaft securingly engages the first end, and the threaded bolt securingly engages the hole.

Thus has been broadly outlined the more important features of the present wheel balance device for a motorcycle so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
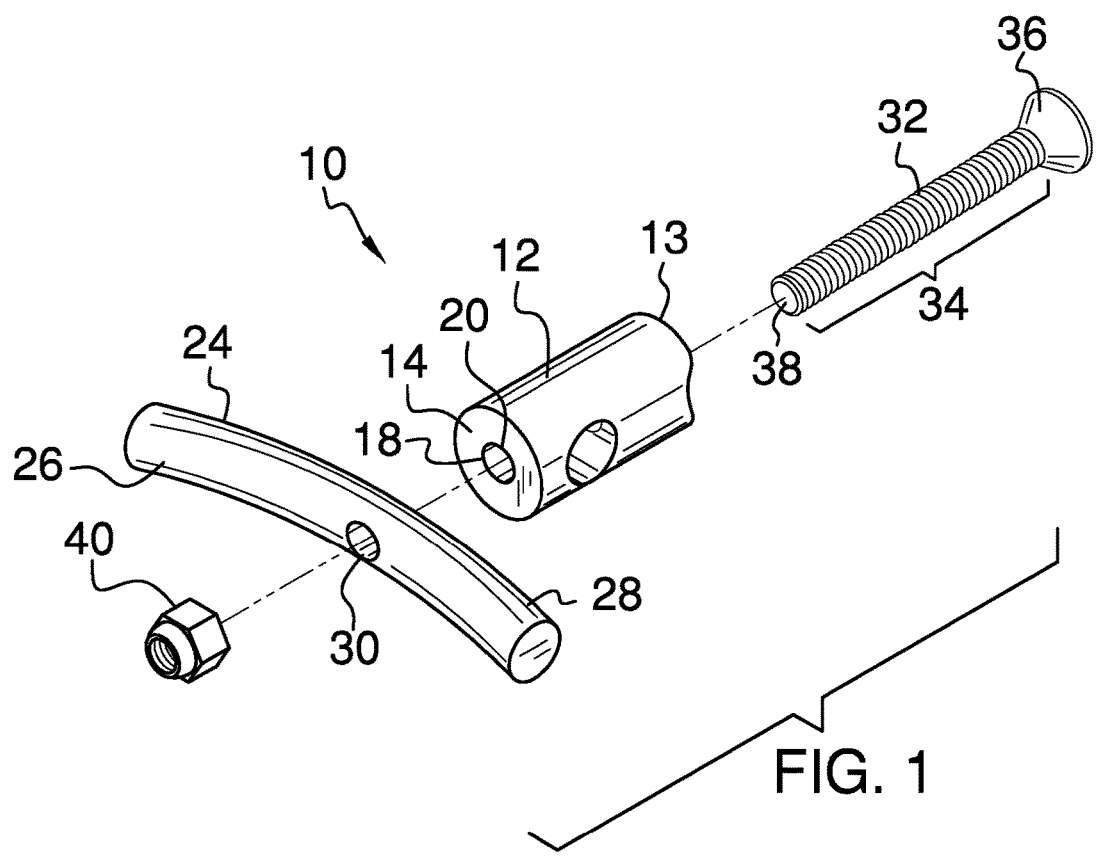
FIG. 1 is a perspective view of an assembled wheel balance device for a motorcycle including a first threaded screw slidingly engaging a pedestal and a weight with a lock nut securable to the first threaded screw.
Figure 2:
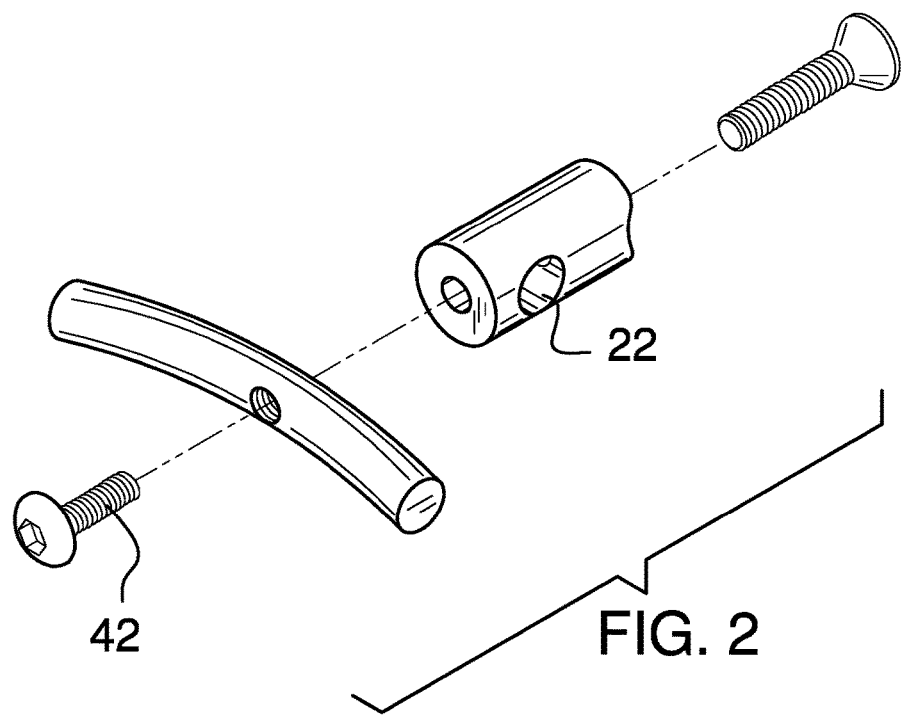
FIG. 2 is a perspective view of the assembled wheel balance device for a motorcycle including a second threaded screw slidingly engaging the pedestal and a threaded fastener engaging the weight with the threaded fastener securable to the second threaded screw
Figure 3:
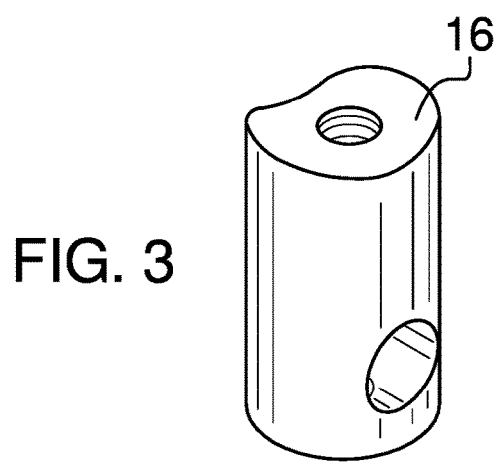
FIG. 3 is an exploded perspective view of FIG. 1.
Figure 4:
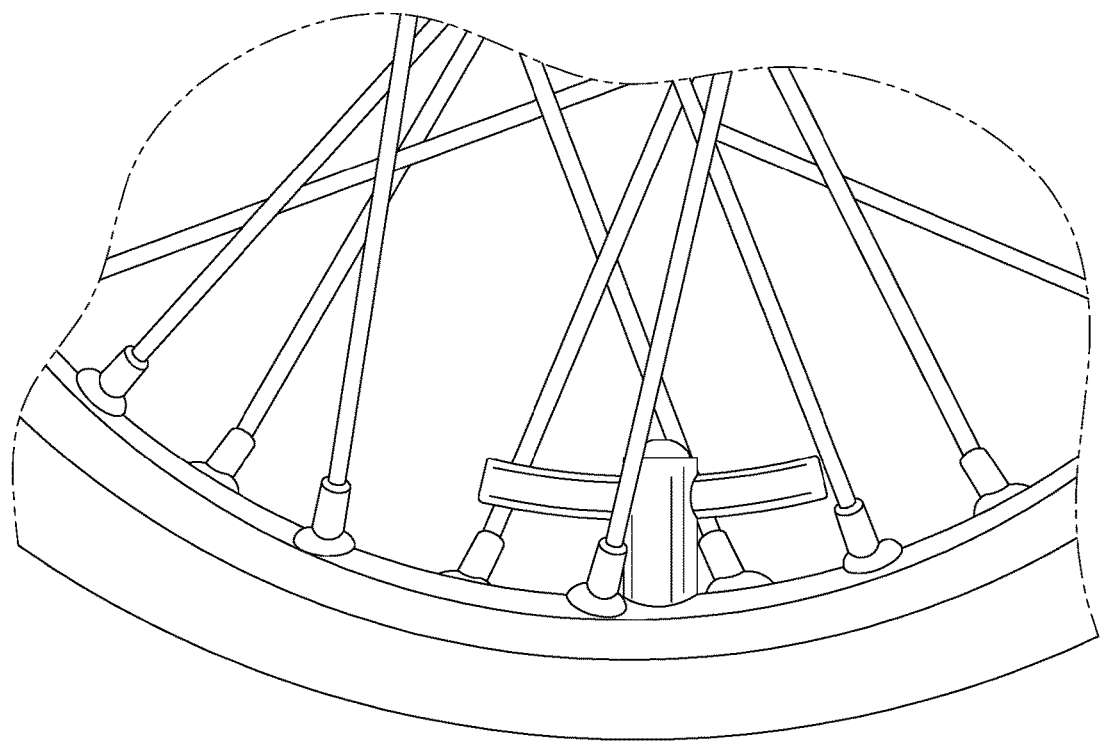
FIG. 4 is an in-use perspective view of the assembled wheel balance device.
Figure 5:
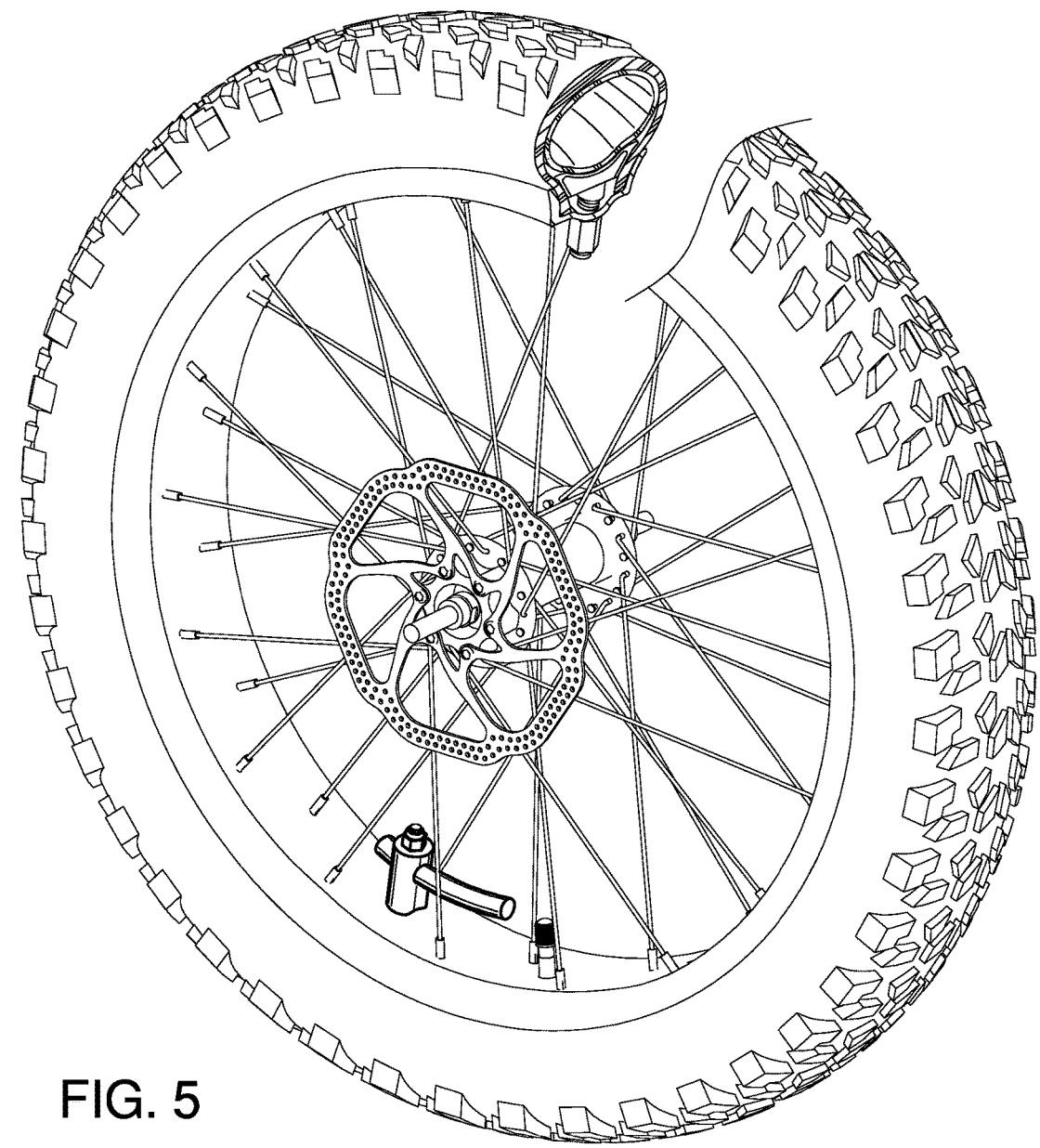
FIG. 5 is an in-use perspective view of the assembled wheel balance device with a partial cutaway view illustrating positions of a rim lock and a pneumatic tire valve relative the wheel balance device.

With reference now to the drawings, and in particular FIGS. 1 through 5 thereof, an example of the instant wheel balance device for a motorcycle employing the principles and concepts of the present wheel balance device for a motorcycle and generally designated by the reference number 10 will be described.

FIGS. 1 through 5 illustrate the present wheel balance device for a motorcycle, which is devised to counterbalance a rim lock within a rim channel of a motorcycle wheel and a pneumatic tire valve to achieve balance of the motorcycle wheel. The wheel balance device for a motorcycle includes a pedestal 12 vertically attachable to a crown of an inner rim of a motorcycle wheel rim. The pedestal 12 has a first end 13, a second end 14 opposite the first end 13, an outer wall 16 disposed between the first end 13 and the second end 14, and an opening 18 at the second end 14. As illustrated, the pedestal 12 is preferably cylindrical; however, the pedestal 12 is not limited to a cylindrical shape. In addition, the first end 13 is preferably concave as illustrated, but is not constrained to a concave shape. The first end 13 conforms to a shape of the crown. A longitudinal channel 20 is centrally disposed through an entire length of the pedestal 12. An orifice 22 is transversely disposed through the pedestal 12. The orifice 22 can be centered or alternately disposed more proximal either the first end or the second end. The longitudinal channel 20 intersects with the orifice 22 within the pedestal 12.

A weight body 24 is insertable through the orifice 22. The weight body 24 is formed of an anticorrosive metal. The weight body 24 is arched to substantially conform to a shape of the inner rim. The weight body 24 has a front end 26 and a rear end 28. A hole 30 is transversely disposed through the weight body 24. The hole 30 is alignable with the channel 20 when the weight body 24 is inserted through the orifice 22.

A threaded fastener 32 securingly engages both the channel 20 and the hole 30 through the weight body 24 when the weight body 24 is inserted through the orifice 22 and the hole 30 of the weight body 24 is aligned with the channel 20. The threaded fastener 32 secures the weight body 24 to the pedestal 12 in a transverse position with the front end 26 of the weight body 24 on one side of the pedestal 12 and the rear end 28 of the weight body 24 on an opposite side of the pedestal 12 from the front end 26.

The threaded fastener 32 has a threaded shaft 34 extending from an oval head 36 and an outer end 38. The threaded fastener 32 also includes either a threaded lock nut 40 or a threaded bolt 42 that works in conjunction with the threaded shaft 32 to secure the weight body 24 to the pedestal 12. When the threaded lock nut 40 is provided, the threaded shaft 32 engages both the entire channel 20 and the hole 30 through the weight body 24 and the threaded lock nut 40 securingly engages the outer end 38 of the threaded shaft 32 in a position directly adjacent the second end 14. When the threaded bolt 42 is provided, each of the first end 13 and the hole 30 is threaded, the threaded shaft 32 securingly engages the first end 13, and the threaded bolt 42 securingly engages the hole 30.

What is claimed is:

1. A wheel balance device for a motorcycle comprising:
   a pedestal vertically attachable to a crown of an inner rim of a motorcycle wheel rim, the pedestal having a first end attachable to and conforming to a shape of the crown, a second end opposite the first end, and an outer wall between the first end and a second end;
   an orifice transversely disposed through the pedestal;
   a longitudinal channel centrally disposed through an entire length of the pedestal, wherein the longitudinal channel intersects with the orifice;
   a weight body insertable through the transverse orifice, wherein the weight body is arched and substantially conforms to a shape of the inner rim, the weight body further having a front end and a rear end;
   a hole transversely disposed through the weight body, wherein the hole is alignable with the channel when the weight body is inserted through the orifice; and
   a threaded fastener securingly engaging both the channel and the hole through the weight body when the weight body is inserted through the orifice and the hole of the weight body is aligned with the channel, wherein the threaded fastener secures the weight body to the pedestal in a transverse position with the front end of the weight body on one side of the pedestal and the second end of the weight body on an opposite side of the pedestal from the front end.

2. The wheel balance device for a motorcycle of claim 1 wherein the threaded fastener has a threaded shaft and a threaded lock nut, wherein the threaded shaft extends from an oval head and has an outer end, wherein the threaded shaft engages both the entire channel and the hole through the weight body, wherein the threaded lock nut securingly engages the outer end of the threaded shaft in a position directly adjacent the second end.

3. The wheel balance device for a motorcycle of claim 2 wherein the orifice is disposed more proximal either the first end or the second end.

4. The wheel balance device for a motorcycle of claim 1 wherein the threaded fastener has a threaded shaft extending from an oval head and a threaded bolt, wherein each of the first end and the hole is threaded, wherein the threaded shaft securingly engages the first end and the threaded bolt securingly engages the hole.

5. The wheel balance for a motorcycle of claim 4 wherein the orifice is disposed more proximal either the first end or the second end.

6. The wheel balance device for a motorcycle of claim 1 wherein the orifice is disposed more proximal either the first end or the second end.

7. A wheel balance device for a motorcycle comprising:
   a cylindrical pedestal vertically attachable to a crown of an inner rim of a motorcycle wheel rim, the pedestal having a concave first end attachable to and conforming to a shape of the crown, a second end opposite the first end, and an outer wall between the first end and a second end;
   an orifice transversely disposed through the pedestal, wherein the orifice is disposed more proximal either the first end or the second end;
   a longitudinal channel centrally disposed through an entire length of the pedestal, wherein the longitudinal channel intersects with the orifice;
   a weight body insertable through the orifice, the weight body is arched and substantially conforms to a shape of the inner rim, the weight body further having a front end and a rear end;
   a hole transversely disposed through the weight body, wherein the hole is alignable with the channel when the weight body is inserted through the orifice; and
   a threaded fastener securingly engaging both the channel and the hole through the weight body when the weight body is inserted through the orifice and the hole of the weight body is aligned with the channel, wherein the threaded fastener secures the weight body to the pedestal in a transverse position with the front end of the weight body on one side of the pedestal and the rear end of the weight body on an opposite side of the pedestal from the front end.

8. The wheel balance device for a motorcycle of claim 7 wherein the threaded fastener has a threaded shaft and a threaded lock nut, wherein the threaded shaft extends from an oval head and has an outer end, wherein the threaded shaft engages both the entire channel and the hole through the weight body, wherein the threaded lock nut securingly engages the outer end of the threaded shaft in a position directly adjacent the second end.

9. The wheel balance device for a motorcycle of claim 8 wherein the hole through the weight body is disposed more proximal either the front end or the rear end.

10. The wheel balance device for a motorcycle of claim 8 wherein the weight body is formed of an anticorrosive metal.

11. The wheel balance device for a motorcycle of claim 7 wherein the threaded fastener has a threaded shaft extending from an oval head and a threaded bolt, wherein each of the first end and the hole is threaded, wherein the threaded shaft securingly engages the first end and the threaded bolt securingly engages the hole.

12. The wheel balance device for a motorcycle of claim 11 wherein the hole through the weight body is disposed more proximal either the front end or the rear end.

13. The wheel balance device for a motorcycle of claim 11 wherein the weight body is formed of an anticorrosive metal.

14. The wheel balance device for a motorcycle of claim 7 wherein the hole through the weight body is disposed more proximal either the front end or the rear end.

15. The wheel balance device for a motorcycle of claim 7 wherein the weight body is formed of an anticorrosive metal.

\* \* \* \* \*